United States Patent [19]

Kelly

[11] 4,361,615

[45] Nov. 30, 1982

[54] BOWLING LANE

[75] Inventor: Peter B. Kelly, Coshocton, Ohio

[73] Assignee: General Electric Company, Schenectady, N.Y.

[21] Appl. No.: 262,801

[22] Filed: May 12, 1981

Related U.S. Application Data

[63] Continuation of Ser. No. 60,755, Jul. 26, 1979, abandoned, which is a continuation of Ser. No. 767,263, Feb. 10, 1977, abandoned.

[51] Int. Cl.³ .......................... B32B 3/00; B32B 7/14
[52] U.S. Cl. .................................... 428/203; 156/222; 156/335; 273/51; 428/204; 428/207; 428/211; 428/503; 428/507; 428/511; 428/530; 428/537
[58] Field of Search ............... 428/151, 154, 187, 503, 428/530, 511, 153, 302, 323, 331, 451, 507, 502, 516, 195, 201, 211, 207, 203, 204, 537; 156/62.2, 222, 224, 289, 288, 335; 273/51

[56] References Cited

U.S. PATENT DOCUMENTS

| | | | |
|---|---|---|---|
| 2,531,168 | 11/1950 | Snyder | 273/51 |
| 3,135,643 | 6/1964 | Michl | 428/530 X |
| 3,323,977 | 6/1967 | Hood | 428/151 |
| 3,345,248 | 10/1967 | Pounds et al. | 428/503 |
| 3,373,071 | 3/1968 | Fuerst | 428/451 |
| 3,378,433 | 4/1968 | Palazzolo et al. | 428/302 |
| 3,928,706 | 12/1975 | Gibbons | 428/323 |
| 3,951,714 | 4/1976 | Franco | 156/62.2 |

OTHER PUBLICATIONS

Bowling, Jan. 1977, p. 6, "First All Synthetic Lane Surface Approved by ABC for Sanctioned Play".

*Primary Examiner*—Thomas J. Herbert, Jr.
*Attorney, Agent, or Firm*—Hedman, Casella, Gibson & Costigan

[57] ABSTRACT

The invention relates to bowling lanes in which at least part of the lane approach surface and at least part of the lane surface proper is of a suitable decorative laminate panel, the foul line configuration being molded or incorporated in said laminate.

20 Claims, No Drawings

BOWLING LANE

This application is a continuation of application Ser. No. 060,755, July 26, 1979, now abandoned, which application is a continuation of application Ser. No. 767,263, Feb. 10, 1977, now abandoned.

The invention relates to new and improved bowling lane structures. More particularly, the invention relates to bowling lanes in which at least part of the lane approach surface and at least part of the lane surface proper is of a suitable decorative laminate, the foul line configuration being in laminate, the lane portion of said decorative laminate panel matching or approximating the surface finish of the remainder of the lane proper with the approach area portion of the laminate panel having a surface finish to match or approximate that of the remainder of the approach area.

Standard bowling lanes are often constructed of suitably finished hardwood blocks or planking. In such a lane bed, usually about 41 to 42 inches wide, the construction typically consists of from about 39 to 42 maple planks or boards about one inch thick laid edgewide or on edge in line with the longitudinal axis of the lane. The surface of the lane is then made flat and coated with varnish or lacquer which may be treated, as with mineral oil, to adjust the coefficient of friction or slippage of the surface in order to produce uniform action and control of the bowling ball. The surface finish consists typically of a nitrocellulose or polyurethane lacquer or varnish which can be treated with plasticizers and other additives to provide with the oil treatment, if indicated, the desired wear and slippage or friction characteristics.

It has also been suggested that the bowling lane surface be of suitable wear and impact resistant decorative plastic laminate having a plurality of thermosetting resin impregnated, fibrous core sheets such as of paper, a decorative fibrous print sheet and an overlying resin-containing protective layer, the decorative surfacing being in the form of panels which can be cemented, fixed or suitably adhered to the lane substrate which can be of wood as above or of hardboard, plywood, flakeboard, chipboard or the like, or even of concrete, cement-asbestos board, filled asphalt, stone or metal sheets as desired. The laminate surface is so constructed as to approximate the same reaction to ball delivery as wooden lanes. It has also been suggested that the lane surface be made of sheets of resinous material such as phenol-formaldehyde and the like.

At the ball delivery end of the lane or between the lane or alley proper and the approach or runway area, there is normally a foul line which in actual play no player is permitted to cross without being penalized. In some cases this four line may be painted at the juncture point of the lane proper and the approach area. However, it has been found that such painted foul lines are, in actual practice, short lived and unsuitable. It has also been suggested to fabricate a foul line of molded resinous or other material which is inserted in a slot between the lane and approach area, the foul line structure being cemented, glues or otherwise adhered in its slot. This is a widely used arrangement. However, it has been found that the so inserted foul line structure under accidental pounding of the ball, contact from the feet of the player, under physical stress transmitted to it when the ball contacts the alley or lane, or from traffic in general, tends to become loose, and raised or even detached, and hazardous, therefore necessitating frequency fitting and recementing.

From the above it will be seen that it would be most desirable to a bowling alley to have a foul line structure which would be more durable and free from the effects of physical stresses, abrasion and the like, and it is a primary object of the present invention to provide such a foul line structure.

Those features of the invention which are believed to be novel are set forth with particularity in the claims appended hereto. The invention will, however, be better understood and further advantages and objects thereof appreciated from a consideration of the following description.

Briefly, according to the present invention, at least part of the lane approach surface and the lane surface proper is of a suitable decorative laminate panel with the foul line configuration contained within the laminate panel. The lane portion of the panel matches or approximates the lane finish or decor and the approach area portion matches or approximates the rest of the approach area.

The decorative laminate of the present invention is readily made. The core sheets are typically of kraft paper which can be impregnated with any of the thermosetting resins used in the production of decorative laminate. The most common of these resins is a condensation product of a phenol and an aldehyde and generally an alkaline catalyzed phenol formaldehyde condensation product. A specific phenolic resin used in this connection is a light colored, thermosetting, general purpose phenol formaldehyde resin of the above description sold by the Monsanto Company under the name of Resinox 470. As in typical decorative laminates, the core sheets of kraft paper or creped kraft paper or relected combinations of such papers which can be reinforced as desired are overlaid with a so-called print sheet which imparts the decorative effect as of wood grain or any other desired finish to the laminate. Any of a number of thermosetting resins can be used for impregnating the print sheet where this is indicated including, preferably, a condensation product of melamine and an aldehyde, such materials being characterized by excellent wearing, translucency and resistance to discoloring. A specific material found useful in this connection is a modified melamine formaldehyde reaction product sold by American Cyanamid Company under the name of Cymel 428. This resin is a white, free-flowing powder specifically designed for the treatment of paper to be used in decorative laminates. The resin is readily soluble in water or in alcohol-water mixtures and gives a clear, colorless solution which is stable at 50 percent by weight solids content for at least two days at room temperature. Typical properties of a 50 percent aqueous solution of this resin at 25° C. include a pH of 8.8 to 9.6, and a Gardner viscosity of A to B. However, other resins such as ureas, aminotriazines, light colored, highly purified phenolic resins, polyester resins including unsaturated alkyd-vinyl monomer types, acrylics, ethoxyline resins and the like can also be used. Among the melamine resins which can be used are the several more fully described in U.S. Pat. No. 2,605,205. In preparing the plastic laminate, the core, usually of kraft paper, is impregnated in any desired manner with the thermosetting resin and dried, the resin content of the dried core paper sheet before consolidation ranging generally from about 20 to 29 percent by weight for ordinary kraft paper and from about 30 to 37 percent by weight of resin for the normally used creped kraft paper. In the present invention the foul line configuration is preferably in or on the print sheet.

Where a paper overlay or protective layer is used, this is normally of a highly purified, transparent, alpha cellulose, although it can also consist of other transparent or highly translucent cellulosic or synthetic resin fibers such as those of rayon or mixtures of such fibers such as those described in U.S. Pat. No. 2,816,851, among others. This material is usually impregnated with a melamine resin such as that above and usually dried to a resin content of from about 60 to 70 percent by weight before consolidation.

If desired, the abrasion and wear resistance of the paper layer can be increased by incorporating therein relatively hard or abrasion-resistant materials such as finely divided silica, silicon carbide, emery, diamond, tungsten carbide, titanium carbide, boron nitride, aluminum oxide and mixtures of such materials with each other and with other finely divided materials, the wear or abrasion resistance of the overlay being specifically tailored as desired by using materials of the desired hardness or abrasion resistance. These materials can be uniformly distributed throughout the overlay as by the teaching of U.S. Pat. No. 3,373,070, to give uniform abrasion resistance as the overlay is worn away or they can be concentrated in the surface of the overlay or graded through the thickness of the overlay as desired.

In lieu of the thermosetting resin impregnated paper overlay, there can be used a thermosetting resin as such or compositions which take the place of the overlay. Typical of such thermosetting resin composition overlays are those described in U.S. Pat. Nos. 3,135,643 and 3,371,071 which are included by reference herein. According to these patents, a surface coating composition for decorative laminates is provided comprising a thermosetting resin of silica flour and a finely divided fibrous material in the form of discrete fibers. The silica flour and the finely divided fibrous material have a refractive index approximating that of the cured thermosetting impregnating resin where a transparent or highly translucent effect is desired. It will be realized, of course, that the silica flour can be substituted wholly or in appropriate amounts by the other hard materials, including those mentioned above, to obtain good abrasion resistance and desired transparency effect. This coating composition greatly improves the abrasion resistance of the laminates to which it is applied.

In any of the laminate structures above, the usual black foul line configuration is contained within or on the print sheet which is protected by the overlay sheet or overlying hard surface coating as described above. The foul line can be applied in any convenient manner as by printing or inking it on the print sheet, inlaying it and the like. The foul line may also be inked on the underside of the overlay paper when this sheet is used, but the approach would not normally be preferred because of handling difficulties. In preparing the laminate panel, the lane portion of the laminate panel can readily be prepared with a gloss or finish to match the remainder of the lane in well-known manner as by simply pressing the lane portion of the laminate during fabrication against a stainless steel pan or other suitable surface which produces a surface to match the gloss of the lane proper which is usually higher than that of the approach area, be it wood or decorative laminate or other material. Likewise, the approach area of the laminate is pressed against a surface which will produce a finish or gloss to match the remainder of the approach or runway area. Typically, where the gloss of the approach area is duller than the lane proper, aluminum foil of suitable mat finish can be used to produce the lesser degree of gloss. Other materials such as plastic films well known to those skilled in the art can also be used. It will be realized, of course, that the entire approach or that area behind the lanes proper may be of the same construction, that is, of laminates. It will also be realized that in certain cases the gloss of the approach area may be the same as that of the lane proper so that no such special or dual finish producing means need be used to preparing the present laminate.

The following examples are illustrative of the practice of the present invention, it being realized that they are not to be taken as limiting in any way.

EXAMPLE 1

There was prepared an overlay of alpha cellulose paper impregnated with a 50 percent water solution of melamine formaldehyde resin, specifically Cymel 428, the impregnated paper being dried to a resin content of 65 percent by weight. There was also prepared in a similar manner core layers of 120 pound basis weight kraft paper and 140 pound basis weight creped kraft paper which were impregnated with a 50 percent solution of standard alkaline catalyzed phenol-formaldehyde resin, the dried resin content of each such core layer being about 30 percent by weight. The laminate was prepared by successively superimposing one phenolic impregnated kraft paper sheet, two phenolic resin impregnated creped kraft paper sheets, fifteen phenolic resin impregnated kraft paper sheets, one 55 pound basis weight raw or impregnated print sheet with foul line configuration and a melamine resin impregnated overlay paper as described above. The laminate so laid up was placed in a press with the lane portion polished surface contacting stainless steel panel or pan to produce a finish to match the lane proper and the approach area with an additional contacting aluminum foil to produce a finish to match the approach area. The lay-ups were cured for 18 to 20 minutes at 135° to 145° C. at 1500 psi, the laminate then being cooled still under pressure to below 40° C. and removed from the press. Actually, the laminating process is of a time-temperature-pressure nature and can be prepared by curing for from about 15 to 30 minutes at from about 120° C. to 150° C. at pressures ranging from about 1000 psi to about 1500 psi. The resulting laminate was 147 mils thick and was sanded to 142 mils thickness. In this example, a raw or unimpregnated print layer was used so that it could be impregnated, but not excessively, by reason of melamine resin migration from the melamine resin impregnated overlay paper. Print paper, conventionally treated with 30–50 percent by weight of melamine resin, may also be used, however. The finished laminate was cut to size and cemented, using contact cement, to a freshly sanded hardwood bowling lane with the foul line in the usual place with the approach and lane portions overlapping the lane and approach. A typical installation, which can be varied as desired, is, with a twelve foot long panel, to have from three to five feet within the approach proper and the remainder in the lane area, thus removing seams from highly stressed areas because of ball impact, sliding of the player, and the like. Joints between laminate sheets were filled with elastomeric material, specifically RTV silicone calk.

Other useful calks are well known polyurethane and polysulfide materials.

EXAMPLE 2

This example illustrates the practice of the present invention using in lieu of a resin impregnated paper overlay a thermosetting resin layer. The core sheets of this example were prepared as in Example 1. In lieu of the overlay sheet, an abrasion resistant, thermosetting resin composition was used prepared in accordance with Example 1 of U.S. Pat. No. 3,373,071 incorporated herein by reference. This thermosetting resin composition was prepared by mixing in a high shear blender 64 parts of water, 12.5 parts of sodium carboxymethyl cellulose in 2 percent concentration and 10 parts of finely divided silica, there being added after mixing 100 parts of melamine resin, specifically Cymel 428, with further mixing to which resulting mixture there were added again with thorough mixing 10 parts of Avicel microcrystalline cellulose. This resinous composition diluted to 50 percent solids in water, was used to impregnate and coat a 55 pound basis weight print sheet to a dried resin composition content of 50 percent by weight. The foul line stripe, of melamine resin impregnated black paper, was then placed on the treated and coated print sheet; the various layers were then superimposed one upon the other and pressed under heat and with finish producing means as described in Example 1 to produce a laminate having an unsanded thickness of 145 to 150 mils which was reduced by sanding the back or core side to a final total thickness of 143 mils. The finished laminate was cut to size and cemented using contact cement to freshly sanded hardwood bowling lane and approach areas as in Example 1. Joints between laminate sheets were filled with elastomeric material, specifically the material of Example 1.

There are provided by this invention ready and convenient means of providing for bowling lane foul line configurations which are long lasting and not subject to the deficiency of present bowling lane foul line arrangements.

What I claim as new and desire to secure by Letters Patent of the United States is:

1. In a bowling lane having an approach area and a lane area separated by a foul line, the improvement which comprises using a single laminate panel for at least a part of said approach area surface and extending into said lane area beyond said foul line, said laminate panel comprising a resin impregnated reinforced core, a print sheet disposed on said core, a thermosetting resin overlay on said print sheet, said print sheet being between said core and said overlay and the configuration for said foul line being between said overlay and said core and being visible through said overlay.

2. The bowling lane of claim 1, wherein said print sheet is impregnated with a resin compatible with said resin impregnated reinforced core.

3. The bowling lane of claim 1, wherein said overlay contains particulate fillers.

4. The bowling lane of claim 1, wherein said overlay contains translucent fibrous reinforcement.

5. The bowling lane of claim 1, wherein said thermosetting resin for said overlay is melamine resin.

6. The bowling lane of claim 1, wherein said configuration for said foul line is linked on said print sheet.

7. The bowling lane of claim 1, wherein said configuration comprises a strip of paper.

8. The bowling lane of claim 1, wherein the reinforced core is reinforced with a fibrous material.

9. The bowling lane of claim 8, wherein said fibrous material is paper.

10. In a bowling lane, the improvement which comprises using a single decorative laminate panel for at least a part of the approach area surface and extending into the lane proper beyond the foul line, the laminate panel including a resin-impregnated paper core, a print sheet disposed on said resin-impregnated paper core, and a resin-impregnated paper overlay having inked on the undersurface thereof, adjacent said print sheet, the foul line configuration of the lane.

11. In a bowling lane, the improvement which comprises using a single decorative laminate panel for at least a part of the approach area surface and extending into the lane proper beyond the foul line, said laminate panel including a resin-impregnated paper core, a print sheet disposed on said resin-impregnated paper core, said print sheet having the foul line configuration inked thereon, and a protective resin layer disposed over said print sheet.

12. A decorative laminate panel for spanning the foul line area of a bowling lane from the lane proper into at least a part of the lane approach area the laminate panel including a resin-impregnated paper core, a print sheet disposed on the resin-impregnated core, said print sheet having the foul line configuration inked thereon, and a resin-impregnated paper overlay disposed on the print sheet, the lane portion of said laminate panel having a surface finish to match or approximate that of the remainder of the lane, the approach area portion of the laminate panel having a surface finish to match or approximate that of the remainder of the approach area.

13. A decorative laminate panel as in claim 12 in which said lane approach area portion of the panel has a less glossy surface than said lane proper portion of the panel.

14. In a bowling lane, the improvement which comprises using a single decorative laminate panel for at least a part of the approach area surface and extending into the lane proper beyond the foul line, said laminate panel including a resin-impregnated paper core, a print sheet disposed on said resin-impregnated paper core, said print sheet having the foul line configuration of the lane disposed thereon, and a resin-impregnated overlay disposed on said print sheet.

15. A bowling lane as recited in claim 14 wherein said foul line configuration is inked on said print sheet.

16. A bowling lane, as recited in claim 14 wherein said foul line configuration comprises a resin-impregnated strip of paper adhered to said print sheet.

17. A bowling lane as recited in claim 14 wherein said foul line configuration is inlaid into said print sheet.

18. A bowling lane as in claim 14 in which said overlay is a resin-impregnated paper overlay.

19. A bowling lane as in claim 14 in which the print sheet is resin-impregnated.

20. A bowling lane as in claim 19 wherein said resin-impregnated paper core is impregnated with a phenol and aldehyde condensation product, and said print sheet is impregnated with a melamine and aldehyde condensation product.

* * * * *